United States Patent Office 3,276,595
Patented Oct. 4, 1966

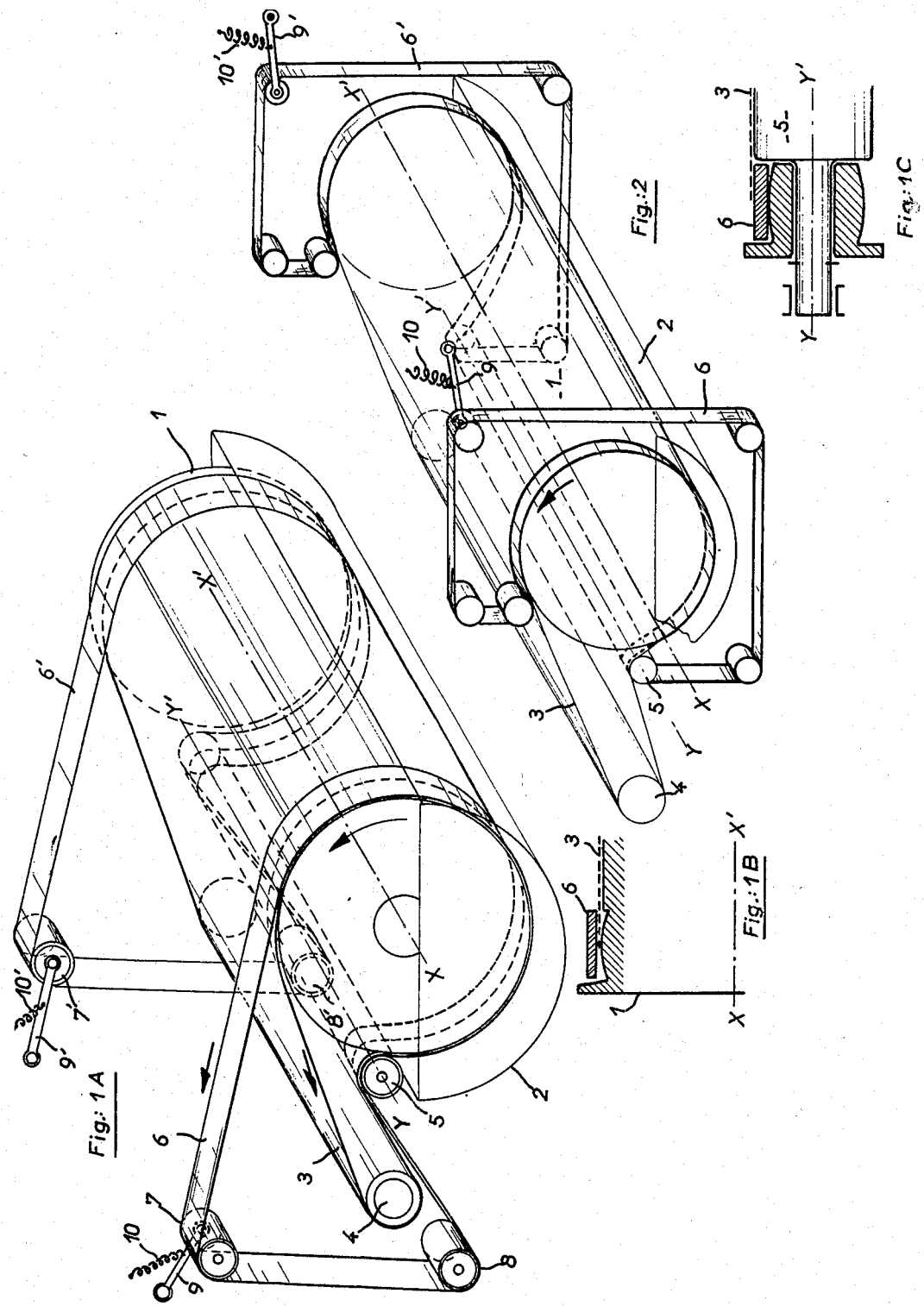

3,276,595
ROTARY DRUM VACUUM FILTERS
Jean Houpillart, Grisy-les-Platres, France, assignor to Societe des Filtres Philippe, Houilles, Seine et Oise, France, a company of France
Filed Mar. 21, 1966, Ser. No. 535,762
Claims priority, application France, Mar. 22, 1965, 10,216
2 Claims. (Cl. 210—401)

This invention concerns rotary drum vacuum filters and relates more particularly to such filters employing cloth discharge of the filter cake.

In rotary drum vacuum filters, divided into cells, of the type employing cloth discharge, the filter cake is collected on and led to the filter outlet by an endless cloth. Generally, this cloth—loaded with filter cake—leaves the vacuum drum by a roller, is cleared of the cake, comes back towards the vacuum drum by means of another roller, enters the tank containing the liquid to be filtered and, by the action of the vacuum existing in the immersed part of the drum, is again covered with cake whilst the filtrate runs through the pores of the filtering layer into the interior of the drum.

During this cycle, particularly when the width of the drum table is great, the cloth is kept on its course by controlling, by various means, its movements one way and another from a median position and by correcting these movements, for example, by the angular movement of a guide roller.

The main disadvantage of apparatus of this type is that it provides poor tightness along the edges of the cloth in contact with the vacuum cells of the drum, either as a result of the formation of folds or by shrinking of the cloth following mechanical or chemical action, or again as a result of displacement of the cloth, the effect of which is to allow the edge regions of the drum cells to communicate with the atmosphere and, correspondingly to reduce the yield of the filter.

It is an object of the invention to improve the vacuum tightness and thus avoid this disadvantage.

According to the present invention a rotary drum vacuum filter comprises two endless belts which accompany and cover the marginal edges of the endless cloth, at least on the portion of the cycle where the cloth is in contact with the vacuum drum, thus ensuring that the cloth adheres completely to the said drum and, correspondingly that there is complete vacuum tightness in the filtration unit.

Preferably the endless belts are made of natural or synthetic elastomer and are placed under tension.

The invention will be described further, by way of example, with reference to the accompanying drawings, in which:

FIG. 1A is a diagrammatic perspective view of a rotary drum vacuum filter embodying the invention, FIG. 1B is a sectional detail of the vacuum drum showing the relative positions of the cloth and the endless belts, FIG. 1C is a sectional detail of one of the guide rollers of the filter, showing the relative positions of the cloth and the belts, and FIG. 2 is a diagrammatic view of an alternative embodiment of the invention.

As shown in FIG. 1A a filter drum 1 with a horizontal axis XX', in communication with a source of vacuum (not shown) is partially immersed in a tank 2 in which the liquid to be filtered arrives. An endless cloth 3 is wound round a section of this drum 1, the said cloth leaving the drum by a roller 4, near which the removal of the filter cake takes place, and returning to it guided by a roller 5 with a horizontal axis YY'. In addition, two endless belts 6 and 6'—elastic and under tension—cover the marginal edges of the cloth 3 on the part of the cycle where the cloth is in contact with the drum 1, the said belts leaving the drum by pulleys 7 and 7', passing over return pulleys 8 and 8', and then over the roller 5 in such a way as to be laid on the cloth 3.

The belts 6 and 6' are put under tension by means of pulleys 7 and 7' carried for example, respectively by articulated arms 9 and 9' which are biased by springs 10 and 10'.

FIGS. 1B and 1C show respectively the relative positions of the endless cloth 3 and the endless belt 6 on the drum 1 and the roller 5, the direction of rotation of the drum being that indicated by the arrows.

In operation it can be seen that the belts 6 and 6' come into contact with the cloth 3 on the roller 5, where they are then under the cloth 3, and thereafter apply themselves against the drum 1 so as to cover and press the marginal edges of the cloth 3 against the drum in such a way as to ensure the vacuum tightness of the filtration unit.

In the embodiment of the invention shown in FIG. 2, the belts 6 and 6' are re-routed to keep clear the zone at which the filter cake is removed from the cloth 3. This embodiment differs from that shown in FIG. 1A only by the path followed by the belts 6 and 6', and it is not necessary to comment on FIG. 2 to help in understanding it.

What is claimed is:
1. In a rotary drum vacuum filter of the type comprising a tank for liquid to be filtered, a rotary vacuum drum having a segment thereof received in said tank and an endless filter cloth passing around and engaging a part of the cylindrical surface of the drum including said segment, the improvement comprising a pair of endless belts each registering with a marginal edge of said cloth for urging said marginal edge into vacuum sealing contact with said drum at least over that part of the path described by the cloth in which said cloth passes around said drum.

2. A filter as set forth in claim 1, wherein said belts are made of an elastomer and are under tension.

No references cited.

REUBEN FRIEDMAN, Primary Examiner.
SAMIH ZAHARNA, Examiner.